United States Patent
Ping et al.

(12)

(10) Patent No.: US 12,245,042 B2
(45) Date of Patent: Mar. 4, 2025

(54) METHOD FOR NETWORK SLICE ISOLATION MANAGEMENT

(71) Applicant: Nokia Technologies Oy, Espoo (FI)

(72) Inventors: Jing Ping, Chengdu (CN); Iris Adam, Munich (DE); Anatoly Andrianov, Schaumburg, IL (US); Xiaoguang Zhao, Hangzhou (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 364 days.

(21) Appl. No.: 17/799,545

(22) PCT Filed: Feb. 14, 2020

(86) PCT No.: PCT/CN2020/075248
§ 371 (c)(1),
(2) Date: Aug. 12, 2022

(87) PCT Pub. No.: WO2021/159461
PCT Pub. Date: Aug. 19, 2021

(65) Prior Publication Data
US 2023/0148302 A1     May 11, 2023

(51) Int. Cl.
*H04W 16/10*     (2009.01)
*H04W 12/03*     (2021.01)

(52) U.S. Cl.
CPC ............ *H04W 16/10* (2013.01); *H04W 12/03* (2021.01)

(58) Field of Classification Search
None
See application file for complete search history.

(56) References Cited

U.S. PATENT DOCUMENTS

2009/0042755 A1   2/2009   Okazaki
2018/0316564 A1   11/2018  Senarath
(Continued)

FOREIGN PATENT DOCUMENTS

CN   109962806 A   7/2019
CN   110476453 A   11/2019
(Continued)

OTHER PUBLICATIONS

"3rd Generation Partnership Project; Technical Specification Group Services and System Aspects; Management and orchestration; Provisioning; (Release 16)", 3GPP TS 28.531 v16.4.0, (Dec. 2019), 69 pages.
(Continued)

*Primary Examiner* — The Hy Nguyen
(74) *Attorney, Agent, or Firm* — Robert P. Michal, Esq.; Carter, DeLuca & Farrell LLP

(57) ABSTRACT

A method for network isolation management is described. The method includes assigning or creating one or more isolation groups for at least one service, wherein resources of services assigned in an isolation group are shared with or without isolation; wherein an isolation group is defined for at least one resource in each layer and each domain to gather the at least one resource of the at least one service; linking an isolation profile for each of the one or more isolation groups, wherein the isolation profile comprises at least one policy to protect the at least one resource of the one or more isolation groups, and wherein the isolation profile comprises at least an isolation level to define a type of isolation; and allocating or reallocating the at least one resource to the at least one service based on the isolation profile linked to the one or more isolation groups.

10 Claims, 12 Drawing Sheets

(56) References Cited

U.S. PATENT DOCUMENTS

2021/0119879 A1* 4/2021 Zhang .................... H04L 41/40
2021/0289436 A1* 9/2021 Hu ......................... H04L 41/40

FOREIGN PATENT DOCUMENTS

WO     WO 2019/081005 A1    5/2019
WO     WO-2020001044 A1 *   1/2020 ......... H04L 41/0806

OTHER PUBLICATIONS

"3rd Generation Partnership Project; Technical Specification Group Services and System Aspects; System architecture for the 5G System (5GS); Stage 2 (Release 16)", 3GPP TS 23.501 v16.3.0, (Dec. 2019), 417 pages.

"3rd Generation Partnership Project; Technical Specification Group Services and System Aspects; Management and orchestration; Concepts, use cases and requirements (Release 16)", 3GPP TS 28.530 v16.1.0, (Dec. 2019), 30 pages.

"Generic Network Slice Template Version 2.0", GSM Association, GSMA NG.116, (Oct. 16, 2019), 61 pages.

International Search Report and Written Opinion for Patent Cooperation Treaty Application No. PCT/CN2020/075248 dated Nov. 18, 2020, 9 pages.

ZTE et al., "Solution for Supporting the Complete Slice Isolation Between Slicing Groups", SA WG2 Meeting #127, S2-183182, (Apr. 16-20, 2018), 417 pages.

\* cited by examiner

METHOD FOR NETWORK SLICE ISOLATION MANAGEMENT

CROSS-REFERENCE TO RELATED APPLICATIONS

This application is a national phase entry of International Application No. PCT/CN2020/075248, filed Feb. 14, 2020, the contents of which are hereby incorporated by reference in their entirety.

TECHNICAL FIELD

The examples and non-limiting embodiments relate generally to security, privacy, and digital rights management, and more particularly, to a method for network slice isolation management.

BACKGROUND

It is known to provide resources in a wireless communication network.

SUMMARY

The following summary is merely intended to be an example. The summary is not intended to limit the scope of the claims.

In one aspect, a method includes assigning or creating one or more isolation groups for at least one service, wherein resources of services assigned in an isolation group are shared with or without isolation; wherein an isolation group is defined for at least one resource in each layer and each domain to gather the at least one resource of the at least one service; linking an isolation profile for each of the one or more isolation groups, wherein the isolation profile comprises at least one policy to protect the at least one resource of the one or more isolation groups, and wherein the isolation profile comprises at least an isolation level to define a type of isolation; and allocating or reallocating the at least one resource to the at least one service based on the isolation profile linked to the one or more isolation groups.

In another aspect, an apparatus includes at least one processor; and at least one non-transitory memory including computer program code; wherein the at least one memory and the computer program code are configured to, with the at least one processor, cause the apparatus at least to perform: assign or create one or more isolation groups for at least one service, wherein resources of services assigned in an isolation group are shared with or without isolation; wherein an isolation group defined for at least one resource in each layer and each domain to gather the at least one resource of the at least one service; link an isolation profile for each of the one or more isolation groups, wherein the isolation profile comprises at least one policy to protect the at least one resource of the one or more isolation groups, and wherein the isolation profile comprises at least an isolation level to define a type of isolation; and allocate or reallocate the at least one resource to the at least one service based on the isolation profile linked to the one or more isolation groups.

In another aspect, an example non-transitory program storage device readable by a machine, tangibly embodying a program of instructions executable by the machine for performing operations is provided, the operations comprising: assigning or creating one or more isolation groups for at least one service, wherein resources of services assigned in an isolation group are shared with or without isolation; wherein an isolation group is defined for at least one resource in each layer and each domain to gather the at least one resource of at the least one service; linking an isolation profile for each of the one or more isolation groups, wherein the isolation profile comprises at least one policy to protect the at least one resource of the one or more isolation groups, and wherein the isolation profile comprises at least an isolation level to define a type of isolation; and allocating or reallocating the at least one resource to the at least one service based on the isolation profile linked to the one or more isolation groups.

In another aspect, an apparatus includes means for assigning or creating one or more isolation groups for at least one service, wherein resources of services assigned in an isolation group are shared with or without isolation; wherein an isolation group defined for at least one resource in each layer and each domain to gather the at least one resource of the at least one service; means for linking an isolation profile for each of the one or more isolation groups, wherein the isolation profile comprises at least one policy to protect the at least one resource of the one or more isolation groups, and wherein the isolation profile comprises at least an isolation level to define a type of isolation; and means for allocating or reallocating the at least one resource to the at least one service based on the isolation profile linked to the one or more isolation groups.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
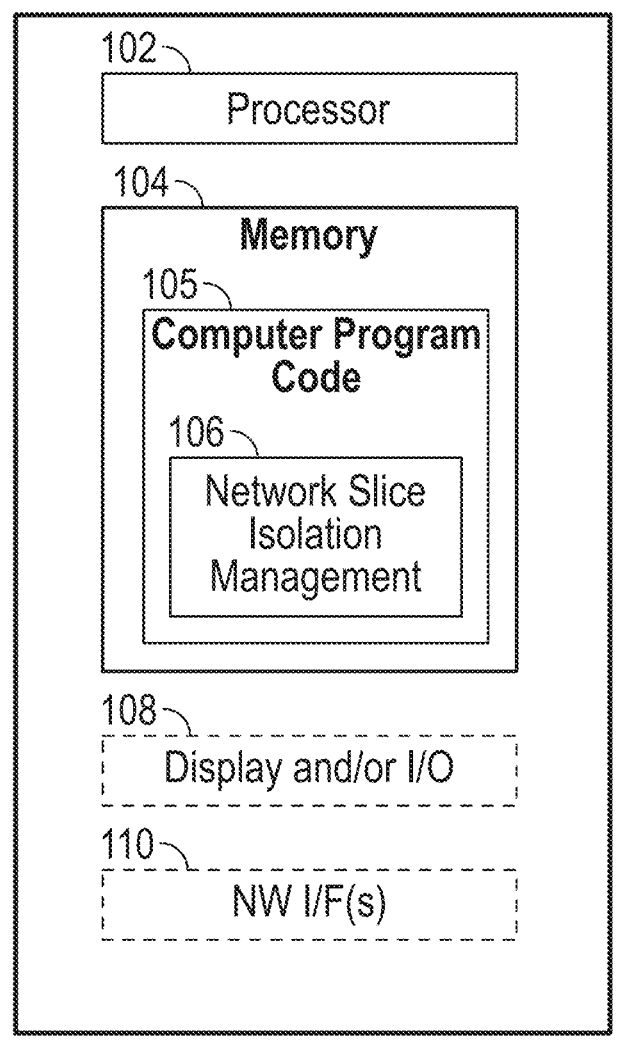
FIG. 1 is an example apparatus, which may be implemented in hardware, configured to implement network slice isolation management based on the examples described herein.

The following acronyms and abbreviations that may be found in the specification and/or the drawing figures are defined as follows:

3GPP third generation partnership project
5G fifth generation
5GC 5G core network
AN Access Network
CN Core Network
CS circuit switched
DN Distinguish Name
E2E End to End
eMBB Enhanced Mobile Broadband
ETSI European Telecommunications Standards Institute
F False
FM Fault Management
gNB (or gNodeB) base station for 5G/NR, i.e., a node providing NR user plane and control plane protocol terminations towards the UE, and connected via the NG interface to the 5GC
GSM Global System for Mobile Communications
GSMA GSM Association
GSMA NG GSMA Networks Group
GST General Slice Template
Id identifier
I/F interface
IG isolation group
IOC information object class
IoT internet of things
M mandatory
MF Managed Function
MFPRAN Managed Function Provider Radio Access Network
MFC Managed Function Consumer
MFI Managed Function Instance
MFP Managed Function Provider/Producer
MFPCN MFP Core Network
mIoT massive internet of things
MNO Mobile Network Operator
MnS Management Service
MOI Managed Object Instance
NF Network Function
NFVO Network Functions Virtualization Orchestrator
ng or NG new generation
NR new radio
NS Network Slice
NSC Network Service Consumer
NSI Network Slice Instance
NSP Network Service Provider
NSS Network Slice Subnet
NSSC Network Slice Subnet Consumer
NSSCN Network Slice Subnet Core Network
NSSI Network Slice Subnet Instance
NSSP Network Slice Subnet Provider/Producer
NSSPCN Network Slice Subnet Provider/Producer Core Network
NSSPRAN Network Slice Subnet Provider/Producer Radio Access Network
NSSPTN Network Slice Subnet Provider/Producer Transport Network
NSSRAN Network Slice Subnet Radio Access Network
NSSTN Network Slice Subnet Transport Network
NW network
O optional
PM Performance Management
PNF physical network function
pol policy
RAN radio access network
RLS row level security
SA2 Service architecture—working group 2
SA5 Service architecture—working group 5
SD slice differentiator
SLA Service Level Agreement
S-NSSAI Single Network Slice Selection Assistance Information
SSL Secure Sockets Layer
SST Slice/Service Type
T True
TLS Transport Layer Security
TN Transport Network
TS technical specification
UE User Equipment (e.g., a wireless, typically mobile device)
UML Unified Modeling Language
URLLC Ultra-Reliable Low-Latency Communication
V vesa2rsion
VLAN virtual local area network
VIM virtual infrastructure manager
VM virtual machine
VNF virtual network function
VNFM VNF manager
VPN virtual private network
ZSM Zero touch network & Service Management Described herein are examples that relate to an E2E network slice and service management architecture.

FIG. 1 is an example apparatus 100, which may be implemented in hardware, configured to implement network slice isolation management based on the examples described herein. The apparatus 100 comprises a processor 102, at least one non-transitory memory 104 including computer program code 105, wherein the at least one memory 104 and the computer program code 105 are configured to, with the at least one processor 102, cause the apparatus to implement network slice isolation management 106 based on the examples described herein. The apparatus 100 optionally includes a display 108 that may be used to display aspects of the system or to provide input and output (I/O). The apparatus 100 optionally includes one or more network (NW) interfaces (I/F(s)) 110. The NW I/F(s) 110 may be wired and/or wireless and communicate over the Internet/other network(s) via any communication technique. The NW I/F(s) 110 may comprise one or more transmitters and one or more receivers.

The apparatus 100 may be configured to implement the functions of a Network Slice Management Function/Provider (NSMF/NSP), or a Network Slice Subnet Management Function/Provider (NSSMF/NSSP), or a Network Function Management Function/Managed Function Provider (NFMF/MFP). The management functions are generally independent equipment, though in some limited cases the management function can be part of a network element.

Network Slice has been specified in 3GPP SA2 and SA5 (refer to 3GPP TS 23.501, TS 28.530 and TS 28.531) as normative content. Network Slice in 3GPP SA2 or SA5 context is on the E2E slice or service layer/domain, and Network Slice Subnet is on another specific layer/domain.

In 3GPP TS 28.530 V16.1.0 (2019 December), Section 4.1.9 describes the tenant information concept, indicating that the purpose of tenant information is to support a multiple tenant environment in 5G network management, and further indicating that the 3GPP management system may use tenant information for associating communication services with the tenant, and controlling management capabilities access by the tenant.

As a key technology of 5G networks, Network Slice enables a Mobile Network Operator (MNO) to offer network resources to its enterprise or vertical customers more efficiently and effectively.

Weak network slice isolation may compromise the security of the entire 5G network. For example sensitive data, managed inside a network slice, could be exposed to applications running in other network slices services through side channel attacks. This risk is even higher since isolation is distributed over each of the security domains of the underlying 5G security architecture. Therefore tenant/slice isolation is important to ensure a reliable and warranted service assurance, and crucial for commercial deployment of the 5G network based on network slicing technology.

The isolation of slices includes isolation of management resources (e.g. data, functions or services) and managed resources (e.g. data, network functions, infrastructure resource, etc.) in multiple domains (e.g. RAN, Core, Transport, etc.).

The resource of a slice can be dedicated for the slice or shared with other slices. The slice isolation challenge is isolation of resources between slices.

Isolation at multiple layers (E2E Slice/Service, Slice Subnet, Managed Function, etc.) to ensure the expected security level of a network slice is critical for a Mobile Network Operator (MNO) to commercially deploy the 5G network. GSM Association (GSMA) defined the requirement in General Slice Template (GST) to isolate resources of Network Slices in different levels (refer to GSMA NG. 116—Generic Network Slice Template). Some operators also brought the requirement in 3GPP for resource isolation between Network Slices.

However, so far, there is no known central and unified management/orchestration solution to isolate or separate resources of Network Slices across multiple domains (e.g. E2E Service/Slice Management Domains, Core Network, Radio Access Network (RAN), Transport Network, Virtual Infrastructure Management Domains, and infrastructure (including PNFs, VNFs, Virtual Infrastructure, etc. domains)) with different isolation levels.

In addition, even though network slices can be grouped based on common characters and characteristics, e.g. same tenant, same security requirements, etc., isolation between network slice groups during network slice instance deployment and runtime has not been considered either.

The examples described herein introduce a new method to isolate resources of Network Slice(s) from other Network Slice(s) across multiple domains/layers during deployment and runtime, especially in management the plane.

An isolation group (or isolation zone), or similarly an Isolation Group or an Isolation Zone, is introduced to gather sharing resources of Network Slices (or other services in various layers) with or without isolation.

An Isolation Group is defined in each layer of resources forming the E2E Network Slice. For example, there are Isolation Groups in E2E slice layer to group resources of Network Slice Services, the Network Slice Subnet (NSS) layer to group resources of NSS Services, the Managed Function (MF) layer to group resources of MF Services, etc.

An Isolation Group can be further defined based on the type of resource. For example, there are Isolation Groups to group Management Resources of services in a specific layer, and Isolation Groups to group Managed Resources of services in the layer.

An isolation group can be further defined by characters and characteristics (tenant, SST, industry, region, type of IoT devices, etc.).

Each Network Slice, or NSS Service, or MF Service, etc. is assigned one or more Isolation Groups. In an embodiment, at least one service is a committed service in a network slice layer, a network slice subnet service in a slice subnet layer, a managed function service in a managed function layer, or a virtual network function. Thus, a service can be network slice service, network slice subnet service, managed function service.

Network Slices assigned in the same Isolation Group share common resources with or without isolation.

Resources allocated to a Network Slice (or NSS Service, or MF Service, etc.) are physically or logically isolated from resources of other Network Slices (or NSS Services, or MF Services, etc.) assigned in different Isolation Group(s).

The Network Slice (or NSS Service, or MF Service) Consumer (NSC/NSSC/MFC) can create Isolation Groups, set Isolation Groups explicitly for the Network Slice(s) (or NSS Service(s), or MF Service(s)) when the Network Slice Consumer (or NSSC, or MFC) asks the Network Slice (or NSS Service, or MF Service) Provider/Producer (NSP/NSSP/MFP) to allocate/modify a resource or resources for the Network Slice (or NSS Service, or MF Service).

Otherwise the service provider/producer (for example, NSP, NSSP or MFP), may create or select Isolation Group(s) for the Network Slice (or NSS Service, or MF Service) and assign the Isolation Group(s) to the Network Slice (or NSS Service, or MF Service) according to Isolation Profile or other Isolation or sharing requirements from the Service consumer for the requested service.

An isolation profile (similarly, an Isolation Profile) is introduced to define isolation requirements of an Isolation Group. Each Isolation Group is associated with an Isolation Profile. The Isolation Profile includes an isolate level (or isolation level) (as defined in GST). The Isolation Profile should include isolation policies to isolate and protect the resources assigned to the Isolation Group. The Isolation Profile and isolation polices in different domains (e.g. E2E, RAN, Core, Transport, Virtualization, etc. domains) or different layers (e.g. Network Slice, Slice Subnet, Managed Function, Network Service, VNF, etc.) could be different.

The resources of an Isolation Group are separated from other Isolation Group(s) according to the Isolation Profile. Generally, the Isolation Profile is associated to an Isolation Group. In some cases, the Isolation Profile may be associated with the Service Profile of a Supported Service or independent, e.g. in a service allocation request with an isolation requirement but without explicitly identifying the Group. Isolation In this case, the NSP/NSSP/MFP may create or select Isolation Group(s) for the service, link the Isolation Profile(s) to the group(s), and assign the group(s) to the service.

Figure 2:
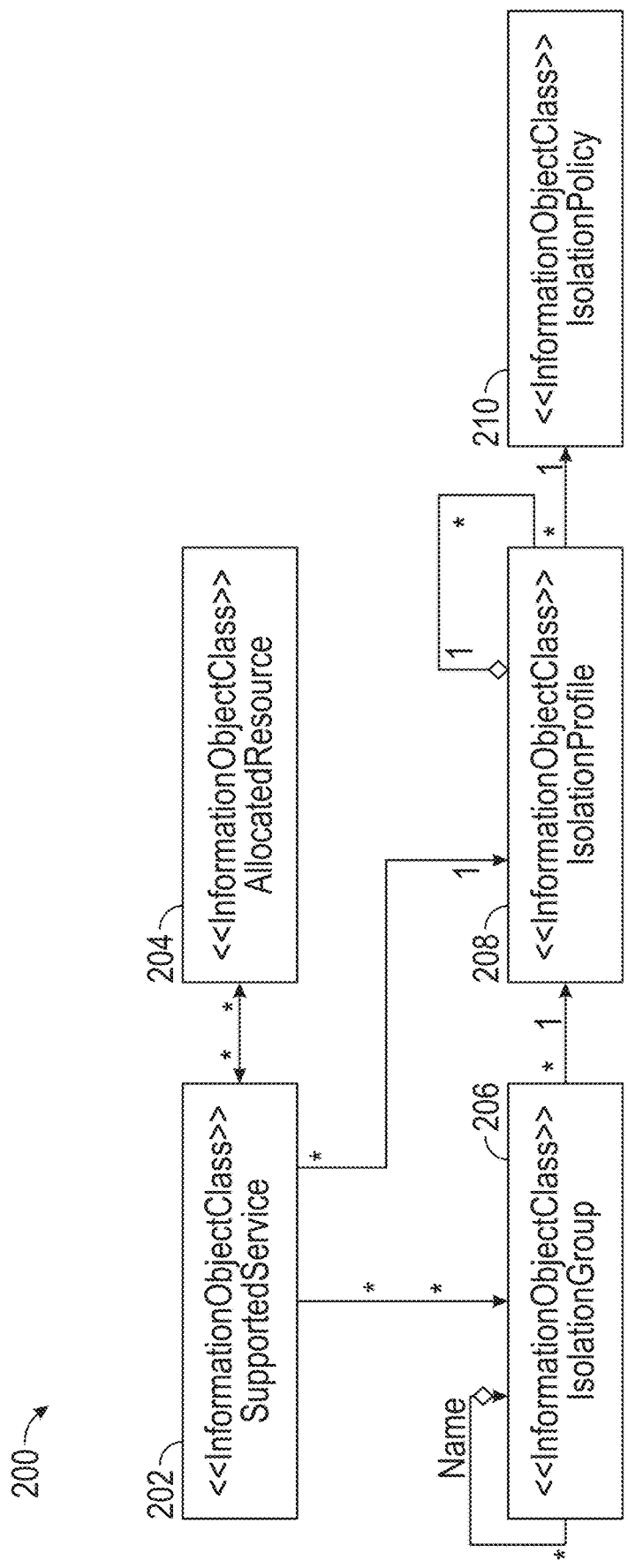
FIG. 2 depicts a class diagram to support resource isolation.

Class Diagram to support resource isolation for supported services. FIG. 2 depicts a class diagram 200 to support resource isolation for supported services. Based on UML, in FIG. 2, aggregation is graphically represented as a hollow diamond shape, composition is graphically represented as a solid diamond shape, the star '*' represents a multiplicity of instances, '1' represents one instance, and an arrow represents a directional association.

Several classes of type InformationObjectClass are shown, including the SupportedService 202 class, the AllocatedResource 204 class, the IsolationGroup 206 class, the IsolationProfile 208 class, and the IsolationPolicy 210 class.

In FIG. 2, there is a bi-directional association between the SupportedService 202 and the AllocatedResource 204. There is a directional association between the SupportedService 202 and the IsolationGroup 206. There is a directional association between the SupportedService 202 and the IsolationProfile 208. There is a directional association between the IsolationGroup 206 and the IsolationProfile 208. There is a directional association between the IsolationProfile 208 and the IsolationPolicy 210. There is a naming containment between IsolationGroup 206 and itself (represented by the text 'name' and solid diamond association), as well as an aggregation between the IsolationProfile 208 and itself.

The SupportedService 202 can be a Committed Service in the Network Slice layer, an NSS Service in the Slice Subnet layer, an MF service in the Managed Function layer, a Network Service and VNF in the virtualization case, etc. The AllocatedResource 204 can be a Network Slice Instance (NSI) in the Network Slice layer, an NSS Instance (NSSI) in the Slice Subnet layer, a MF Instance (MFI) in the Managed Function layer, a Network Slice Instance and VNF instance (VM or container based) in the virtualization resource layer, etc. Thus, in certain embodiments, the allocated resource may be a network slice instance in a network slice layer, a network slice subnet instance in a slice subnet layer, a managed function instance in a managed function layer, or a virtual network function instance in a virtualization resource layer.

One service is associated to one or more Isolation Group(s). Each group is used to gather one type of resource (e.g. management resource, managed resource, or mixed resource) requested for the service based on group type (e.g. tenant, region, service type (SST), or mixed, etc.). For example, both a management resource (e.g. resource to support FM, PM data of the slice, resource to support Create, Read, Update, Delete operations for the slice, etc.) and a managed resource (e.g. resource to support RAN, TN, CN Network Functions/NF Services, subscriber data) may be used for network slice management, operation and serving to the end user. There could be several Isolation Groups created to support resource isolation of the network slice. Some groups are for management resource isolation, and some are for managed resource isolation.

An Isolation Group may be a root Isolation Group or contained by another Isolation Group (bigger scope). E.g. a SST Isolation Group may be contained by a Tenant Isolation Group. Each Isolation Group is associated to an Isolation Profile to define an Isolation Level, and Isolation and Protection Policies, etc. (for example IsolationPolicy 210). If one Isolation Group contains another Isolation Group, the Isolation Level of the containing Isolation Group may be stricter than the Isolation Level of Contained Isolation Group. For example, if a SST Isolation Group is contained by a tenant Isolation Group, and the Isolation Level of the SST Isolation Group is Logical Isolation, the Isolation Level of the tenant Isolation Group could be Logical or Physical Isolation. If the Isolation Level of the SST Isolation Group is Physical Isolation, the Isolation Level of the tenant Isolation Group should be Physical Isolation.

Isolation for a Supported Service may be based on the Isolation Profile of the Isolation Group of each resource type. An example method is outlined as:

Check Isolation Profile of the linked Isolation Group of resource one
  Check Isolation Profile of the linked Isolation Group (leaf Isolation Group)
  Check Isolation Profile of containing Isolation Group (intermediate IG)
  Check Isolation Profile of containing Isolation Group (intermediate IG or root IG) of the intermediate IG until reaching the root Isolation Group.
Check Isolation Profile of the linked Isolation Group of resource two
  Check Isolation Profile of the linked Isolation Group (leaf Isolation Group)
  Check Isolation Profile of containing Isolation Group (intermediate IG)
  Check Isolation Profile of containing Isolation Group (intermediate IG or root IG) of the intermediate IG until reaching the root Isolation Group
Check Isolation Profile of the linked Isolation Group until all resource types are addressed Accordingly, stated another way, the method includes determining the following. If an isolation group linked to resource of a service is a leaf isolation group, it's a contained by another group (for example, a parent group), and the another group could be contained by further group, until continuing to the root isolation group. Then the method considers the isolation profile of the linked isolation group itself, then the isolation profile of its parent group, then the isolation profile of the parent of the parent group, etc., until the root group is addressed.

Figure 3:
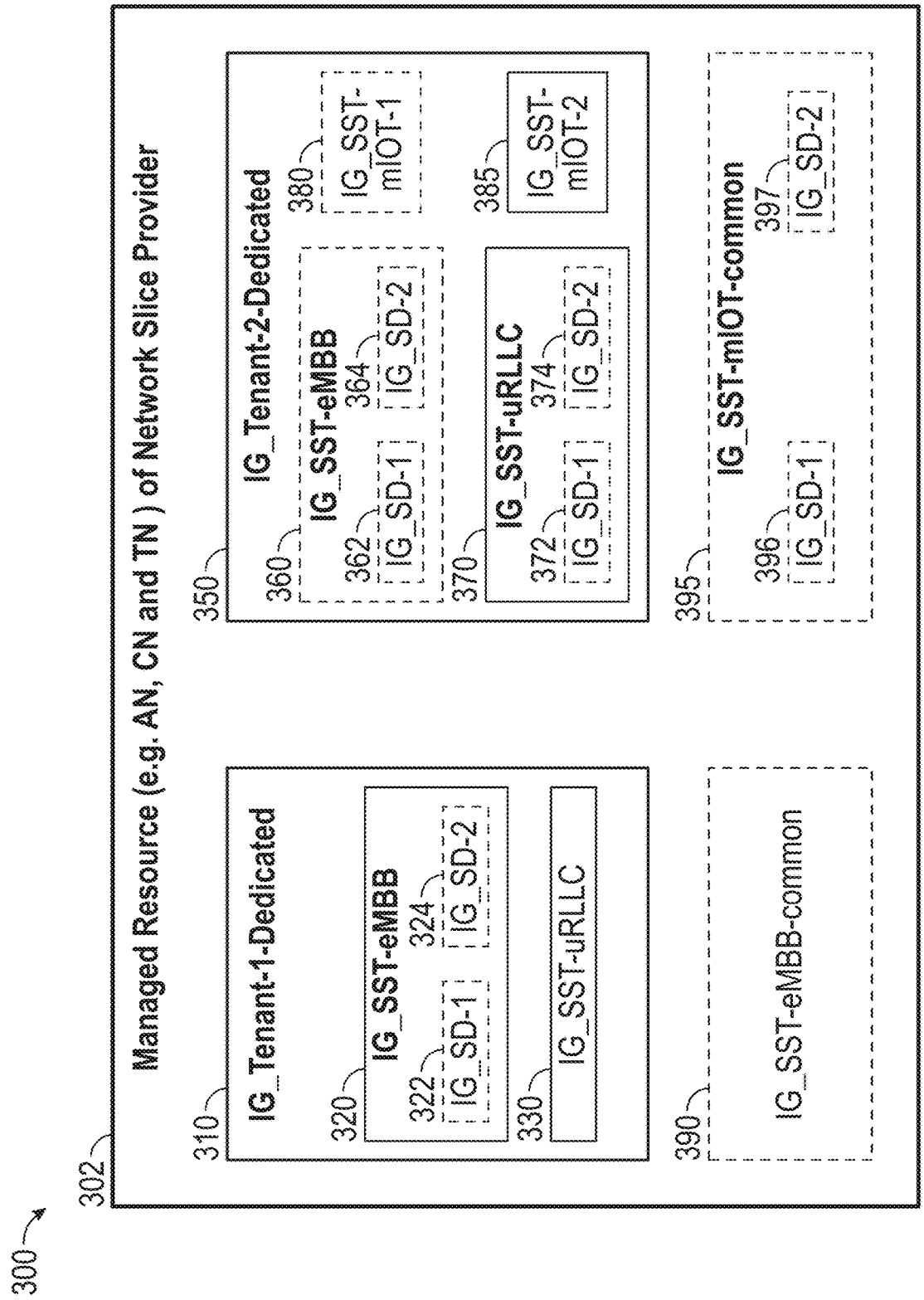
FIG. 3 depicts an example of isolation groups for network slice resources of two tenants.

FIG. 3 depicts an example 300 of isolation groups for network slice resources of two tenants, and network slice resources of two SSTs. The example 300 shown in FIG. 3 is of a Managed Resource (e.g. AN, CN and TN) of Network Slice Provider 302. The two tenant isolation groups are IG_Tenant-1-dedicated 310 and IG_Tenant-2-dedicated 350. The two tenant isolation groups are physically isolated with each other and other IGs. Isolation groups contained within IG_Tenant-1-dedicated 310 are IG_SST-eMBB 320 and IG_SST-uRLLC 330, IG 320 and 330 are physically isolated with each other. IG_SD-1 322 and IG_SD-2 324 are contained within IG_SST-eMBB 320 and logically isolated with each other. Isolation groups contained within IG_Tenant-2-dedicated 350 are IG_SST-eMBB 360, IG_SST-uRLLC 370, IG_SST-mIOT-1 380, and IG_SST-mIOT-2 385, IG 370 and 385 are physically isolated with other IGs and 360 and 380 are logically isolated with other IGs. IG_SD-1 362 and IG_SD-2 364 are contained within IG_SST-eMBB 360 and logically isolated. IG_SD-1 372 and IG_SD-2 374 are contained within IG_SST-URLLC 370 and logically isolated. The Managed Resource (e.g. AN, CN and TN) of Network Slice Provider 302 also comprises isolation groups IG_SST-eMBB-common 390 and IG_SST-mIOT-common 395 to gather Managed Resources for eMBB and mIOT SSTs, IG 390 and 395 are logically isolated with other IGs. Isolation groups IG_SD-1 396 and IG_SD-2 397 are contained within IG_SST-mIOT-common 395 and logically isolated with each other. Thus, as shown in FIG. 3, one or more isolation groups may include a tenant isolation group and a common isolation group.

It may be appreciated that in FIG. 3, and throughout the rest of this disclosure, that the isolation group objects and other objects are named based on the function they are related to or serve. For example, IG_SST-eMBB defines an Enhanced Mobile Broadband (eMBB) slice/service type (SST) isolation group (IG), IG_SD-1 defines a slice differentiator (SD) isolation group (IG), IG_SST-URLLC defines an Ultra-Reliable Low-Latency Communication slice/service type (SST) isolation group (IG), IG_SST-mIOT-1 defines a massive internet of things (mIoT) slice/service type (SST) isolation group (IG), etc.

Resources of services assigned in an isolation group may be shared with or without isolation. As an example, in FIG. 3, there are bigger (e.g., containing) isolation groups such as IG 310, and there are also smaller (e.g., contained) and leaf isolation groups such as 330. The service provider always assigns a leaf IG to a service for a specific resource. Inside this leaf IG (e.g. 330), the resources assigned to services (e.g. service-uRLLC-1 and service-uRLLC-2) are shared without isolation. In another case there is a third service which is an eMBB service (service-eMBB-SD1-3). The service provider would assign another leaf IG (e.g. 322) to this eMBB service. So the resource of service-eMBB-SD1-3 and service-uRLLC-1/service-uRLLC-2 should be isolated from each other as they belong to different isolation groups (IGs). Both 322 and 330 are under the same bigger IG 310. The resource of services in different sub-IGs of the super IG (IG 310) should be isolated. Accordingly, the resource of services in the super IG may be assigned with or without isolation. For example, in this scenario, the service-uRLLC-1 and the service-uRLLC-2 are assigned without isolation. Here, two services assigned to IG 330 are assigned without isolation from each other as they share a common IG, namely IG 330. At the same time, services assigned to IG 330 and services assigned to IG 322 are with isolation even though they share a common IG, namely IG 310.

Figure 4:
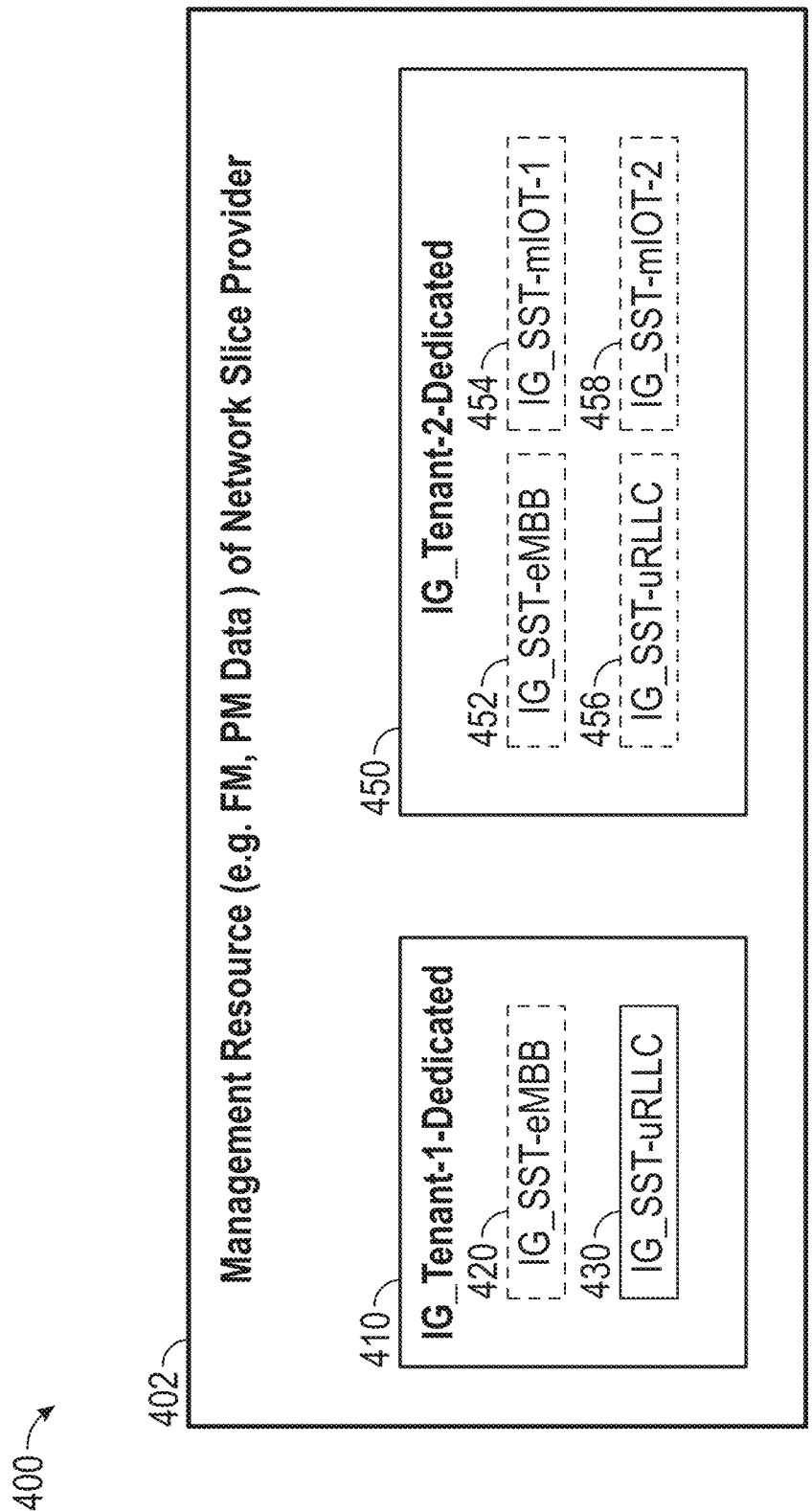
FIG. 4 depicts another example of isolation groups for network slice resources of two tenants.

FIG. 4 depicts another example 400 of isolation groups for network slice resources of two tenants. The example 400 shown in FIG. 4 is of a Management Resource (e.g. FM, PM data) of Network Slice Provider 402. The two tenant isolation groups IG_Tenant-1-dedicated 410 and are IG_Tenant-2-dedicated 450. The two tenant isolation groups are physically isolated with each other and other IGs. Isolation groups contained within IG_Tenant-1-dedicated 410 are IG_SST-eMBB 420 and IG_SST-URLLC 430. 420 is logically isolated with other IGs and 430 is physically isolated with other IGs. Isolation groups contained within IG_Tenant-2-dedicated 450 are IG_SST-eMBB 452, IG_SST-URLLC 456, IG_SST-mIOT-1 454, and IG_SST-mIOT-2 458, the IGs are logically isolated with each other.

Figure 5:
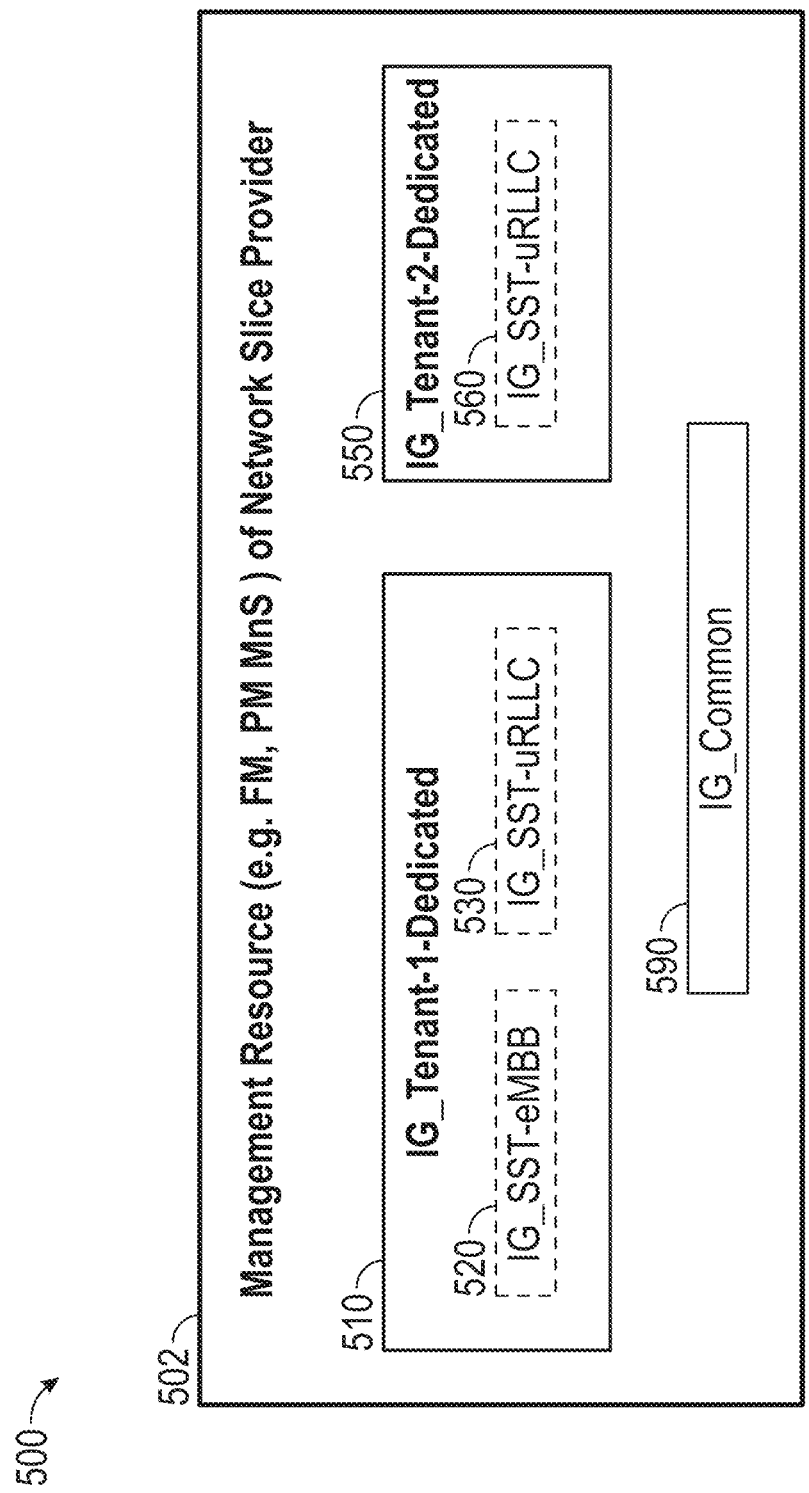
FIG. 5 depicts another example of isolation groups for network slice resources of two tenants.

FIG. 5 depicts another example 500 of isolation groups for network slice resources of two tenants. The example 500 shown in FIG. 5 is of a Management Resource (e.g. FM, PM Management Service (MnS)) of Network Slice Provider 502. The two tenant isolation groups are IG_Tenant-1-dedicated 510 and IG_Tenant-2-dedicated 550. The two tenant isolation groups are physically isolated with each other and other IGs. Isolation groups contained within IG_Tenant-1-dedicated 510 are IG_SST-eMBB 520 and IG_SST-uRLLC 530. They are logically isolated with each other. The isolation group contained within IG_Tenant-2-dedicated 550 is IG_SST-uRLLC 560. The Management Resource (e.g. FM, PM MnS) of Network Slice Provider 502 also comprises isolation group IG_Common 590 which is logically isolated with other IGs.

Information Object Class Definition.

IsolationGroup. The IsolationGroup IOC includes attributes inherited from Top IOC and the following attributes:

| Attribute Name | Support Qualifier | isReadable | isWritable | isInvariant | isNotifyable |
|---|---|---|---|---|---|
| resourceType | M | T | F | T | F |
| groupType | M | T | F | T | F |
| Attributes related to roles | | | | | |
| isolationProfile | M | T | T | F | T | resourceType defines the type of resource that may be allocated to the supported service. resourceType can be for example, management resource (data, management service, etc.), managed resource (management data, function, service, etc.), or a mixed type of resource. The management resource may be a management resource to support supervision generally, e.g. performance management and fault management. The managed resource may be a resource to support a radio access network, a transport network, or a core network function or service. Each type of resource of a service can be associated with one IsolationGroup. groupType defines the character of the IsolationGroup, e.g. it can be a tenant based, service type based, region based, industry based, or mixed, etc. An IsolationGroup can be contained by another IsolationGroup of same resourceType. During Isolation Requirement fulfilment, the service provider may check service profile(s) linked to IsolationGroup(s) in the whole Distinguish Name (DN) path of the id of the linked IsolationGroup, from leaf to root.

IsolationProfile. The IsolationProfile IOC includes attributes inherited from Top IOC and the following attributes:

| Attribute Name | Support Qualifier | isReadable | isWritable | isInvariant | isNotifyable |
|---|---|---|---|---|---|
| isolationLayer | M | T | F | T | F |
| isolationDomain | M | T | F | T | F |
| resourceType | M | T | F | T | F |
| isolationLevel | M | T | T | F | T |
| Attributes related to roles | | | | | |
| isolationPolicy | M | T | T | F | T |
| isolationProfile | O | T | T | F | T | isolationLayer defines the layer of the network in which the related resource is allocated and isolated, it can be, e.g. E2E Service/Network Slice layer, Slice Subnet layer, Managed Function Layer, Network Service and VNF layers in the virtualization case. isolationDomain defines the domain of the network in which the related resource is allocated and isolated, it can be, e.g. E2E Service/Network Slice domain, Core Network (CN) domain, Access Network (AN) domain, Transport Network (TN) Domain, virtualization domain, etc.

Refer to GSMA NG.116 (Generic Network Slice Template) for the definition of isolationLevel.

An isolation level and/or policy can be various for different isolation layers and domains.

An IsolationProfile (e.g., IsolationProfile 208) can be aggregated by another IsolationProfile of the same resourceType, isolationLayer and isolationDomain. When a Service Provider creates IsolationGroup(s) (e.g., one or more of IsolationGroup 206) according to IsolationProfile(s) identified by a Service Consumer, it should create one or more IsolationGroup(s) from the root group to the leaf group according to the aggregation relationship of IsolationProfile(s). If an IsolationProfile was not aggregated by another IsolationProfile, a single IsolationGroup, which is both root and leaf group, may be created for this type of resource requested by the service.

Alternatively, an IsolationProfile may not be defined in hierarchy. There could be a single IsolationProfile to include isolation requirements of all levels. In this case, Service Provider can also create one or more IsolationGroup(s) from the root group to the leaf group according to the requirements defined in the IsolationProfile.

The IsolationPolicy (e.g., IsolationPolicy 210) IOC includes attributes inherited from Top IOC and the following attributes:

| Attribute Name | Support Qualifier | isReadable | isWritable | isInvariant | isNotifyable |
|---|---|---|---|---|---|
| isolationRules | M | T | T | F | T | isolationRules defines rules to isolate and protect a specific resource in a specific layer and domain. For example, rules defined in isolationRules to logically isolate general management data (FM, PM data, log, etc.) of a service in the E2E slice layer could be "protect the data with access control and encryption at rest, protect data with TLS/SSL using a slice specific credential in transmission". Rules to logically isolate a management service could be "dedicated management service instance should be created for the slice". Rules to physically isolate the radio access network subnet for a Network Slice could be "dedicated DUs/Cells should be allocated to the slice", etc. Rules to logically isolate the core network subnet of a Network Slice could be "separate NFs/NF Services of the subnetwork with robust implementations of the virtualization layer (e.g. hypervisor, container platform, etc.), and separate NF/NF Services' traffics with dedicated virtual switches, VLANs, etc."

Figure 6A:
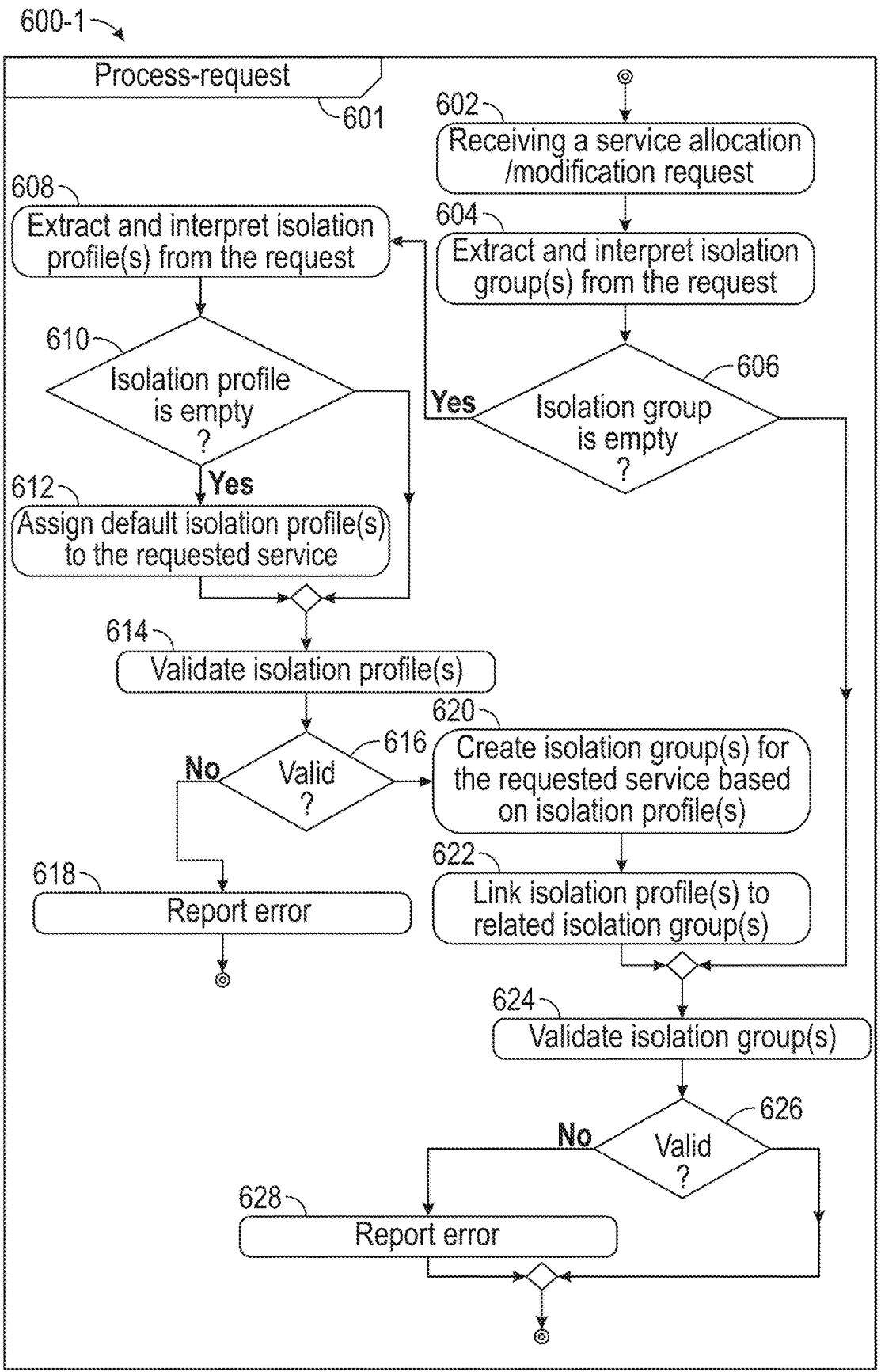
FIG. 6A shows a workflow of creation and validation of isolation groups.
Figure 6B:
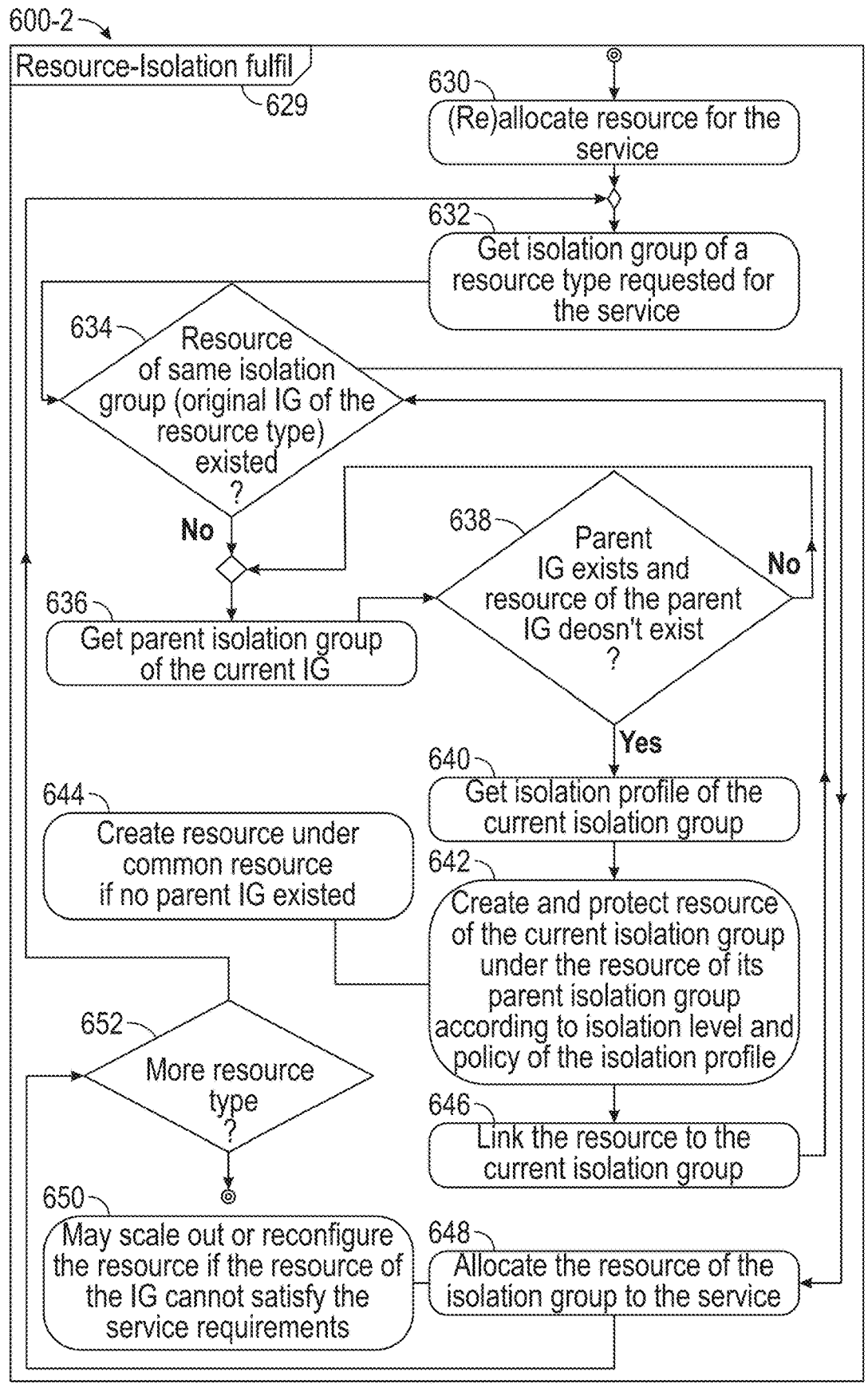
FIG. 6B shows a workflow describing the (re)allocation of resources with isolation groups.

Workflow of Resource Isolation in Service Provider/Producer. FIG. 6A shows an example workflow 600-1 (that is, an example method) of creation and validation of isolation groups. FIG. 6B shows an example workflow 600-2 (e.g., an example method) describing the (re)allocation (e.g., the allocation or reallocation) of resources with isolation groups. FIG. 6A and FIG. 6B may be considered as belonging together.

In FIG. 6A, a request is processed (601). At 602, the method includes receiving a service allocation/modification request. At 604, the method includes extracting and interpreting one or more isolation groups from the request. At 606, the method determines whether the one or more isolation groups is/are empty. If the determination at 606 is positive (e.g., "yes"), then at 608, the method includes extracting and interpreting one or more isolation profiles from the request. If the determination at 606 is negative (e.g., "no"), then the method proceeds to reference number 624 in the workflow. At 610, the method includes determining whether the one or more isolation profiles is/are empty. If the determination at 610 is positive (e.g., "yes"), then at 612, the method includes assigning one or more isolation profiles to the requested service. If the determination at 610 is negative (e.g., "no"), then the method proceeds to reference number 614 of the workflow.

At 614, the method includes validating one or more isolation profiles. At 616, the method includes determining whether the one or more isolation profiles is/are valid. If the determination at 616 is negative (e.g., "no"), then an error is reported at 618. If the determination at 616 is positive (e.g., "yes"), then at 620, the method includes creating one or more isolation groups for the requested service based on the one or more isolation profiles. At 622, the method includes linking one or more isolation profiles to related one or more isolation groups. At 624, the method includes validating one or more isolation groups. At 626, the method includes determining whether the one or more isolation groups are valid. If the determination at 626 is negative (e.g., "no"), an error is reported at 628. If the determination at 626 is positive (e.g., "yes"), then the method proceeds to reference number 630 of the workflow/method 600-2 shown in FIG. 6B In FIG. 6B, a service request is fulfilled (629) with an isolated resource. At 630, the method includes allocating or reallocating a resource for the service. At 632, the method includes getting an isolation group of a resource type requested for the service. At 634, the method includes determining whether a resource of the same Isolation Group (original IG of the resource type) exists. If the determination at 634 is positive (e.g., "yes"), then the method proceeds with allocation of the resource to the service (648). If the determination at 634 is negative (e.g., "no"), then the method proceeds with 636. At 636, the method includes getting the parent Isolation Group of the current IG. At 638, the method includes determining whether the parent IG exists and whether the resource of the parent IG does not exist. If the determination at 638 is positive (e.g., "yes"), the method proceeds to 636. If the determination at 638 is negative (e.g., "no"), then the method proceeds to 640.

At 640, the method includes getting the Isolation Profile of the current isolation group. At 642, the method includes creating and protecting the resource of the current isolation group under the resource of its parent isolation group according to the isolation level and policy of the isolation profile of the current isolation group. As indicated at 644, the step at 642 includes creating the resource under a common resource if no parent IG existed for the current isolation group. At 646, the method includes linking the new resource to the current isolation group, and then proceeds with 634 to check again if the resource of the same Isolation Group (which is the original IG for a resource type of the service) exists. At 648, the method includes allocating the resource of the same isolation group to the service without isolation. As indicated at 650, the step at 648 may include scaling out or reconfiguring the resource if the resource of the same IG cannot satisfy the service requirements. At 652, the method includes determining whether there is more resource type. If the determination at 652 is positive (e.g., "yes"), then the method proceeds to 632, otherwise the method 600-2 terminates.

Network Slice Class Diagram to support Resource Isolation. At least two class implementation options are provided.

Option 1: The Isolation Group is based on "Served Network Slice" in each layer. In this option, model Network Slice Object in E2E Service layer. The MOI is uniquely identified by DN and refers to E2E Slice Id (S-NSSAI).

Option 2: The Isolation Group is based on "Served Service" in each layer. In this option, model Service Object in each layer. The MOI is uniquely identified by DN and independent from E2E Slice Id (S-NSSAI).

Figure 7:
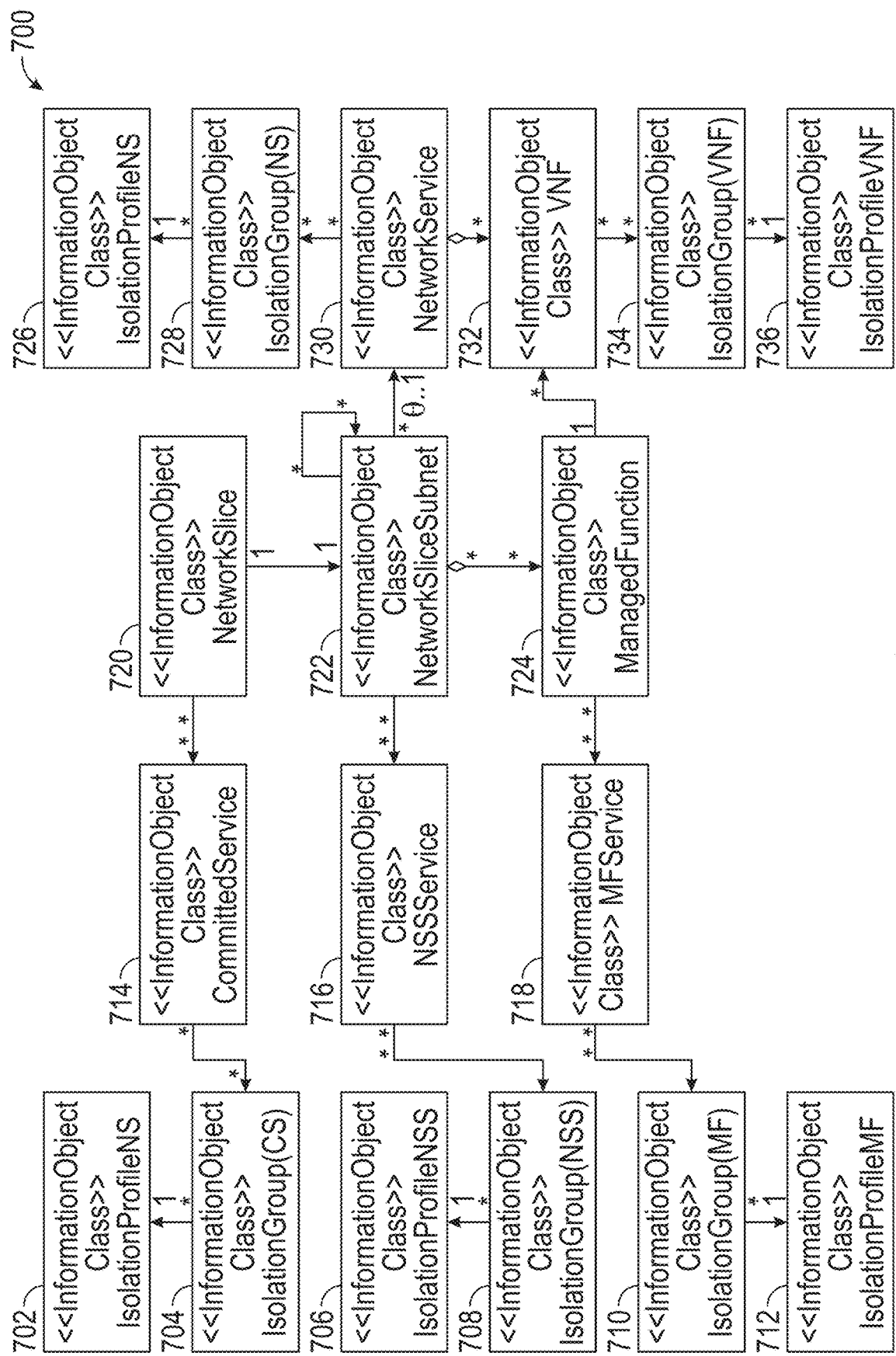
FIG. 7 is a network slice class diagram to support resource allocation.

FIG. 7 is an example network slice class diagram 700 to support resource allocation. Based on UML, in FIG. 7, aggregation is graphically represented as a hollow diamond shape, the star '*' represents a multiplicity of instances, '1' represents one instance, '0 . . . 1' represents zero or one, or one at a time, and an arrow represents a directional association.

In the example shown in FIG. 7, each class is of type InformationObjectClass. There is a directional association between IsolationGroup (CS) 704 and IsolationProfileNS 702. There is a directional association between CommittedService 714 and IsolationGroup (CS) 704. There is a directional association between NetworkSlice 720 and CommittedService 714. There is a directional association between IsolationGroup (NSS) 708 and IsolationProfileNSS 706. There is a directional association between NSSService 716 and IsolationGroup (NSS) 708. There is a directional association between NetworkSliceSubnet 722 and NSSService 716. There is a directional association between NetworkSlice 720 and NetworkSliceSubnet 722. There is a directional association between NetworkSliceSubnet 722 and itself. There is a directional association between IsolationGroup (NS) 728 and IsolationProfileNS 726. There is a directional association between NetworkService 730 and IsolationGroup (NS) 728.

There a association between is directional NetworkSliceSubnet 722 and NetworkService 730. There is a directional association between IsolationGroup (MF) 710 and Isolation-ProfileMF 712. There is a directional association between MFService 718 and IsolationGroup (MF) 710. There is a directional association between ManagedFunction 724 and MFService 718. There is a directional association between NetworkSliceSubnet 722 and ManagedFunction 724. There is a directional association between ManagedFunction 724 and VNF 732. There is a directional association between NetworkService 730 and VNF 732. There is a directional association between VNF 732 and IsolationGroup (VNF) 734. There is a directional association between Isolation-Group (VNF) 734 and IsolationProfileVNF 736.

It may be appreciated that in FIG. 7, and throughout the rest of this disclosure, the name of the object (e.g., a class object) is based on the function it relates to or serves. For example, class object IsolationProfileNS 702 is a network slice profile isolation class object, IsolationGroup (NSS) 708 is a network slice subnet isolation group class object, etc.

Work flow of Resource Isolation fulfilment in multiple layer for Network Slice allocation. The following assumptions are made:

1. In this embodiment, the Network Slice may be supported by a Network Slice Instance (NSI) constituting RAN, CN, and TN NSSIs.
2. gNB is a physical box, CN is virtualized
3. There are three IsolationProfiles defined for the Network Slice.
    IsolationProfileNS-1:
    isolationLayer: "Network-Slice"
    isolationDomain: "E2E"
    resourceType: "Management-MnS"
    isolationLevel: Logical
    isolationPolicy: pol-1
    pol-1:
    isolationRules: ["dedicated MnS instance", "authentication and role-based access control"]
    IsolationProfileNS-2:
    isolationLayer: "Network-Slice"
    isolationDomain: "E2E"
    resourceType: "Management-Data"
    isolationLevel: Logical
    isolationPolicy: pol-2
    pol-2:
    isolationRules: ["attribute-based access control and encryption at rest", "TLS/SSL using slice specific credential in transmission"]
    IsolationProfileNS-3:
    isolationLayer: "Network-Slice"
    isolationDomain: "E2E"
    resourceType: "Managed Resource"
    isolationLevel: logical-NF
    isolationPolicy: pol-3
    pol-3:
    isolationRules: ["dedicated subnetwork and network function", "security gateway to filter ingress/egress traffic of Network Slice"]
4. There is no resource allocated to Network Slice, NSS, MF or NF with the same IsolationGroup(s) in this embodiment. Otherwise, the procedure may be different.

Figure 8:
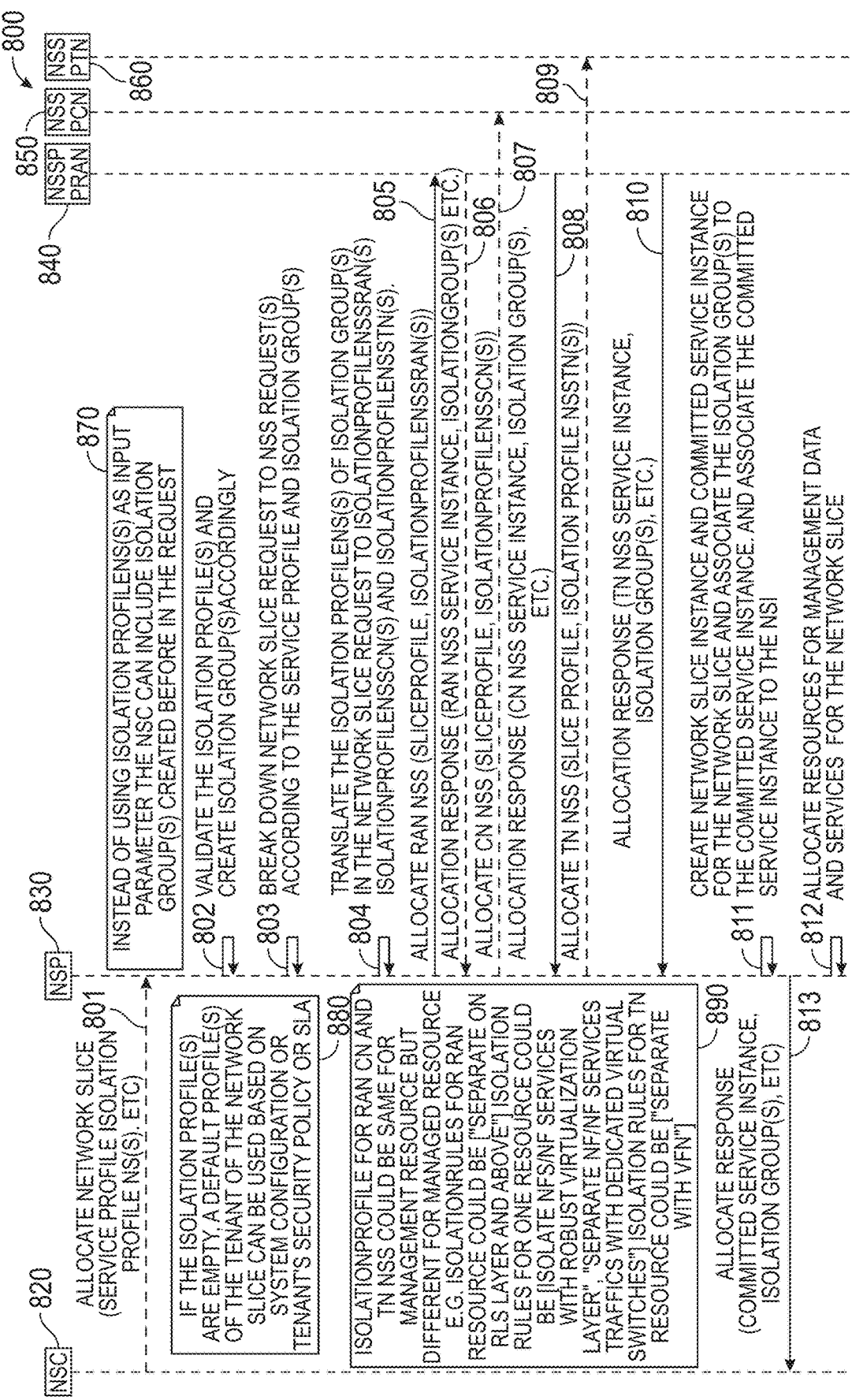
FIG. 8 depicts an example workflow of network slice isolation in the E2E domain.

FIG. 8 depicts an example workflow 800 of network slice isolation in the E2E domain. Shown in FIG. 8 is the NSC 820, NSP 830, NSSPRAN 840, NSSPCN 850, and NSSPIN 860. In FIG. 8, reference numbers 801 to 813 correspond to numbers 1 to 13, respectively. In FIG. 8, the directional arrows are examples, such that in other embodiments an entity may perform the action towards another one of the entities different from what is shown in the workflow 800.

At 801, the NSC 820 asks a NSP 830 to allocate a resource for a network slice, wherein the input parameters include e.g. ServiceProfile, one or more IsolationProfileNS(s), etc. As indicated at 870, instead of using one more or Isolation-ProfileNS(s) as an input parameter, the NSC can include one or more IsolationGroup(s) created before the request. At 802, the NSP 830 validates the one or more Isolation Profile(s) and creates one or more Isolation Group(s) accordingly. As indicated at 880, if the one or more Isolation Profile(s) is/are empty, a one or more default profiles of the tenant of the Network Slice can be used based on the system configuration or a tenant's policy or SLA.

At 803, the NSP 830 breaks down the Network Slice request to one or more NSS requests according to the service profile and one or more IsolationGroup(s). At 804, the NSP 830 translates the one or more IsolationProfileNS(s) of one or more IsolationGroup(s) in the network slice request to one or more IsolationProfileNSSRAN(s), one or more IsolationProfileNSSCN(s), and one or more IsolationProfileNSSTN(s). As indicated at 890, the IsolationProfile for RAN, CN and IN NSS could be the same for Management Resource (see for example FIG. 4 and FIG. 5), but different for Managed Resource (see for example FIG. 3). For example, IsolationRules for a RAN resource could be ["separate on RLS layer and above"], IsolationRules for a Core resource could be ["isolate NFs/NF services with robust virtualization layer", "separate NF/NF Services' traffics with dedicated virtual switches"], and IsolationRules for a TN resource could be ["separate with VPN"].

At 805, the NSP 830 asks NSSPRAN 840 to allocate a resource for the RAN NSS service. The input parameters include e.g. SliceProfile, IsolationProfileNSSRAN(s), etc. At 806, the NSSPRAN 840 provides an allocation response, including e.g. RAN NSS Service Instance, IsolationGroup(s), etc., to the NSP 830. At 807, the NSP 830 asks NSSPCN 850 to allocate a resource for the CN NSS service, wherein the input parameters include e.g. SliceProfile, IsolationProfileNSSCN(s), etc. At 808, the NSSPRAN 840 provides an allocation response, including e.g. CN NSS Service Instance, IsolationGroup(s), etc. to the NSP 830. At 809, the NSP 830 asks NSSPIN 860 to allocate a resource for the TN NSS service, wherein the input parameters include e.g. SliceProfile, IsolationProfileNSSTN(s), etc. At 810, the NSSPRAN 840 provides an allocation response, including e.g. TN NSS Service Instance, IsolationGroup(s), etc., to the NSP 830. At 811, the NSP 830 creates a network slice and committed service instance for the Network Slice and associates the one or more IsolationGroup(s) to the committed service instance, and associates the committed service instance to the NSI. At 812, the NSP 830 allocates resources for management data and services for the network slice based on related IsolationProfile(s) of the Management Resource of the network slice. At 813, the NSP 830 sends a response, including Committed Service Instance, Isolation-Group(s), etc., to the NSC 820.

Figure 9:
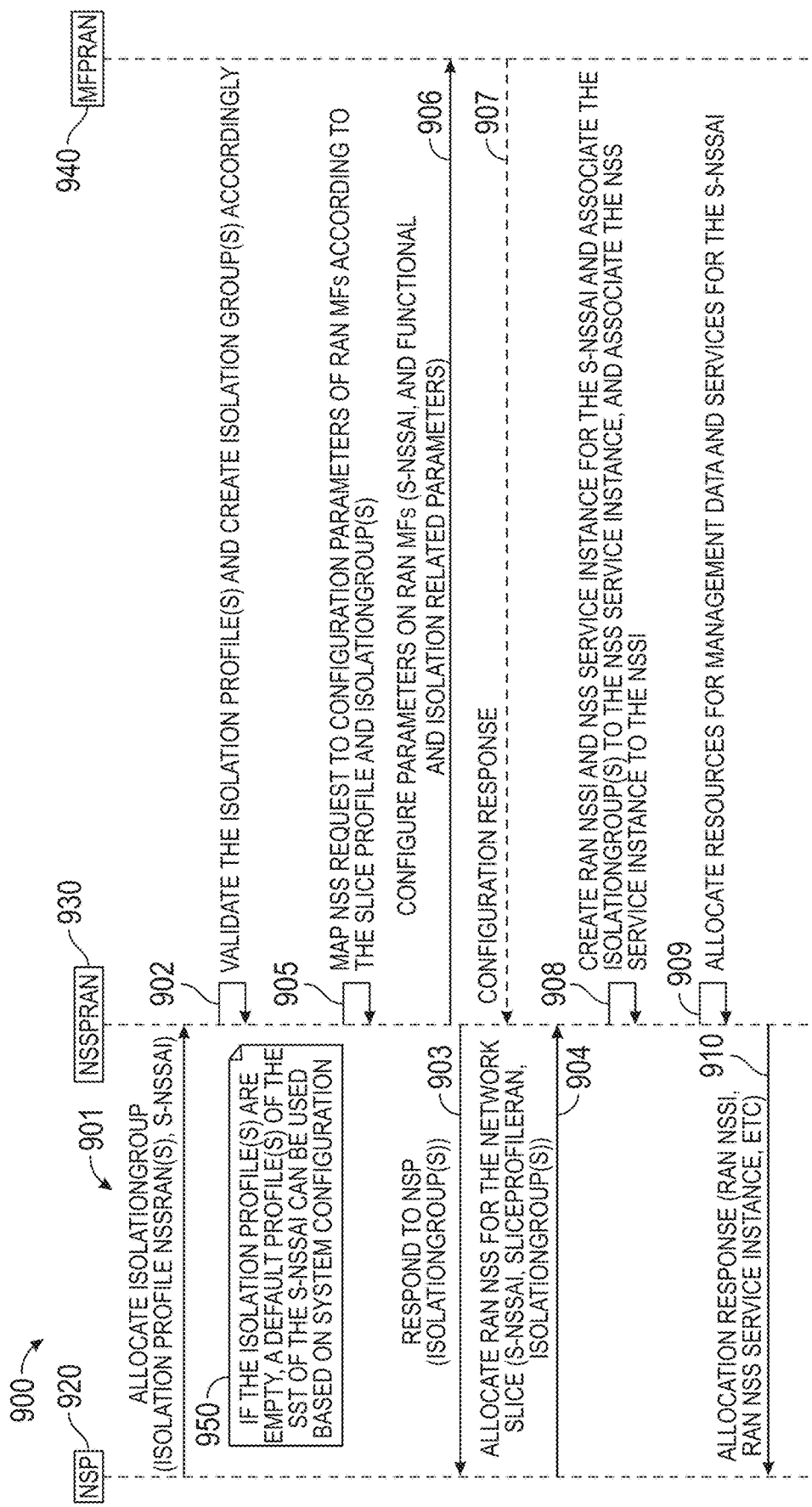
FIG. 9 depicts an example workflow of network slice isolation in the RAN domain.

FIG. 9 depicts an example workflow 900 of network slice isolation in the RAN domain. Shown in FIG. 9 is the NSP 920, NSSPRAN 930, and MFPRAN 940. In FIG. 9, reference numbers 901 to 910 correspond to numbers 1 to 10, respectively. In FIG. 9, the directional arrows are examples, such that in other embodiments an entity may perform the action towards another one of the entities different from what is shown in the workflow 900. This example shows an option that the service consumer assigns the IsolationGroup(s).

At 901, the NSP 920 asks NSSPRAN 930 to allocate IsolationGroup(s), wherein the input parameters include e.g.

IsolationProfileNSSRAN(s), S-NSSAI, etc. At 902, the NSSPRAN 930 validates the one or more Isolation Profile(s) and creates one or more Isolation Group(s) accordingly. As indicated at 950, if the one or more Isolation Profile(s) are empty, one or more default profiles of the SST of the S-NSSAI can be used based on the system configuration. At 903, the NSSPRAN 930 provides a response to the NSP 920 regarding the created one or more IsolationGroup(s).

At 904, the NSP 1020 asks NSSPRAN 930 to allocate RAN NSS for the Network Slice, wherein the input parameters include e.g. S-NSSAI, SliceProfileRAN, IsolationGroup(s), etc.

At 905, the NSSPRAN 930 maps the NSS request to configuration parameters of RAN MFs according to the slice profile and IsolationProfile(s) of the one or more IsolationGroup(s). At 906, the NSSPRAN 930 configures parameters on RAN MFs, such as S-NSSAI and functional and isolation related parameters, f for the MFPRAN 940. At 907, the MFPRAN 940 provides a configuration response to the NSSPRAN 930. At 908, the NSSPRAN 930 creates a RAN NSSI and NSS Service Instance for the S-NSSAI and associates the one or more IsolationGroup(s) to the NSS Service Instance, and associates the NSS Service instance to the NSSI. At 909, the NSSPRAN 930 allocates resources for management data and services for the S-NSSAI based on related IsolationProfile(s) of the Management Resource of the NSS. At 910, the NSSPRAN 930 provides an allocation response, such as RAN NSSI, RAN NSS Service Instance, etc., to the NSP 920.

Figure 10:
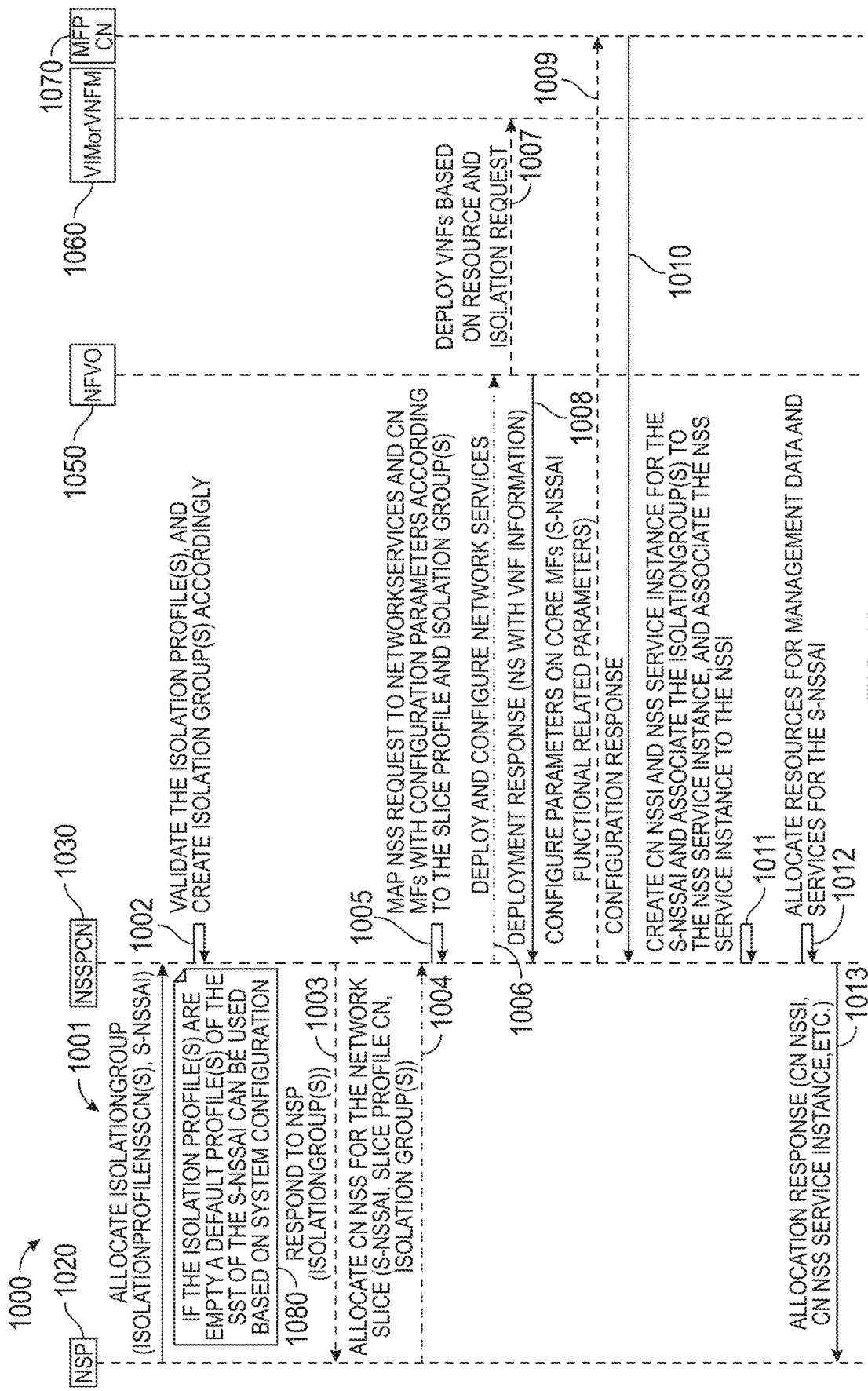
FIG. 10 depicts an example workflow of network slice isolation in the CN domain.

FIG. 10 depicts an example workflow 1000 of network slice isolation in the CN domain. Shown in FIG. 10 is the NSP 1020, NSSPCN 1030, NFVO 1050, VIM or VNFM 1060, and MFPCN 1070. In FIG. 10, reference numbers 1001 to 1013 correspond to numbers 1 to 13, respectively. In FIG. 10, the directional arrows are examples, such that in other embodiments an entity may perform the action towards another one of the entities different from what is shown in the workflow 1000. This example 1000 shows an option where the service consumer assigns the IsolationGroup(s).

At 1001, the NSP 1020 asks NSSPCN 1030 to allocate an IsolationGroup(s), where the input parameters include e.g. IsolationProfileNSSCN(s), S-NSSAI, etc. At 1002, the NSSPCN 1030 validates the one or more Isolation Profile(s) and creates one or more Isolation Group(s) accordingly. As indicated at 1080, if the one or more Isolation Profile(s) are empty, one or more default profiles of the SST of the S-NSSAI can be used based on a system configuration. At 1003, the NSSPCN 1030 provides a response to the NSP 1020 with the created one or more IsolationGroup(s).

At 1004, the NSP 1020 asks NSSPCN 1030 to allocate a CN NSS for the Network Slice, where the input parameters include e.g. S-NSSAI, SliceProfileCN, IsolationGroup(s), etc. At 1005, the NSSPCN 1030 maps the NSS request to Network Services and CN MFs with configuration parameters according to the slice profile and IsolationProfile(s) of one or more IsolationGroup(s). At 1006, the NSSPCN 1030 asks NFVO 1050 to deploy and configure Network Services. At 1007, the NEVO 1050 asks VIM or VNFM 1060 to deploy VNFs based on the resource and isolation request.

At 1008, the NEVO 1050 provides a deployment response, including NS with VNF information to the NSSPCN 1030. At 1009, the NSSPCN 1030 configures parameters on Core MFs, including S-NSSAI and functional related parameters for the MFPCN 1070. At 1010, the MFPCN 1070 provides a configuration response to the NSSPCN 1030. At 1011, the NSSPCN 1030 creates a CN NSSI and NSS Service Instance for the S-NSSAI and associates the one or more IsolationGroup(s) to the NSS Service Instance, and associates the NSS Service instance to the NSSI. At 1012, the NSSPCN 1030 allocates resources for management data and services for the S-NSSAI based on related IsolationProfile(s) of the Management Resource of the NSS. At 1013, the NSSPCN 1030 provides an allocation response, including the CN NSSI, CN NSS Service Instance, etc. to the NSP 1020.

The examples described herein may be contributed to 3GPP SA5 or ETSI ZSM specifications.

Figure 11:
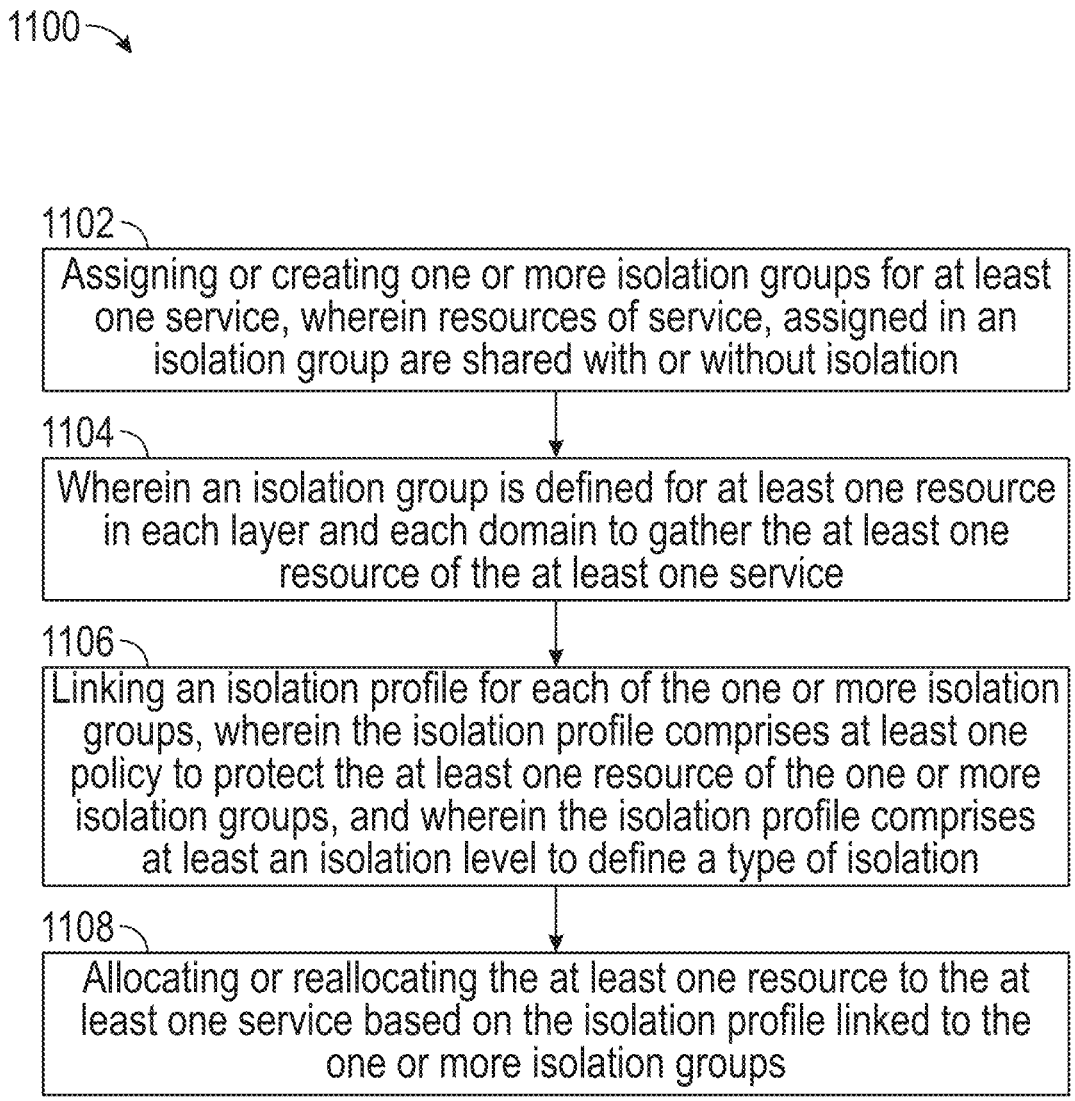
FIG. 11 is an example method to implement network slice isolation management based on the examples described herein.

FIG. 11 is an example method 1100 to implement network slice isolation management based on the examples described herein. At 1102, the method includes assigning or creating one or more isolation groups for at least one service, wherein resources of services assigned in an isolation group are shared with or without isolation. At 1104, the method includes wherein an isolation group is defined for at least one resource in each layer and each domain to gather the at least one resource of the at least one service. At 1106, the method includes linking an isolation profile for each of the one or more isolation groups, wherein the isolation profile comprises at least one policy to protect the at least one resource of the one or more isolation groups, and wherein the isolation profile comprises at least an isolation level to define a type of isolation. At 1108, the method includes allocating or reallocating the at least one resource to the at least one service based on the isolation profile linked to the one or more isolation groups.

An example method includes assigning or creating one or more isolation groups for at least one service, wherein resources of services assigned in an isolation group are shared with or without isolation; wherein an isolation group is defined for at least one resource in each layer and each domain to gather the at least one resource of the at least one service; linking an isolation profile for each of the one or more isolation groups, wherein the isolation profile comprises at least one policy to protect the at least one resource of the one or more isolation groups, and wherein the isolation profile comprises at least an isolation level to define a or type of isolation; and allocating reallocating the at least one resource to the at least one service based on the isolation profile linked to the one or more isolation groups.

The method may further include wherein the isolation group is defined based on a type of the at least one resource, and characteristics of services supported by the at least one resource.

The method may further include wherein resources allocated to service are physically or logically isolated from resources of other services assigned in different isolation groups, based on the isolation profile.

The method may further include wherein the one or more isolation groups are assigned or created by a service consumer or service producer.

The method may further include wherein the isolation level is either physical or logical isolation.

The method may further include wherein the isolation profile is associated with a service profile of a supported service, or is independent.

The method may further include wherein the at least one resource is a management resource, and the at least one resource is a managed resource.

The method may further include wherein the one or more isolation groups is a root isolation group, or the one or more isolation groups is contained by another isolation group.

The method may further include wherein an isolation level of the containing isolation group is stricter than an isolation level of the contained isolation group.

The method may further include determining an isolation for the at least one resource of one service by checking an isolation profile of a containing isolation group until all isolation groups in a chain of containing isolation groups, including the root isolation group, are addressed or considered.

The method may further include determining an isolation for the at least one service by checking an isolation profile of a linked isolation group until a plurality of resource types are addressed.

The method may further include wherein the resources of services assigned in an isolation group are shared without isolation when the resources of the services are assigned in a common isolation group; and wherein the resources of services assigned in an isolation group are shared with isolation when the resources of the services are further assigned in different isolation groups inside the common isolation group.

An example apparatus includes at least one processor; and at least one non-transitory memory including computer program code; wherein the at least one memory and the computer program code are configured to, with the at least one processor, cause the apparatus at least to perform: assign or create one or more isolation groups for at least one service, wherein resources of services assigned in an isolation group are shared or with without isolation; wherein an isolation group is defined for at least one resource in each layer and each domain to gather the at least one resource of the at least one service; link an isolation profile for each of the one or more isolation groups, wherein the isolation profile comprises at least one policy to protect the at least one resource of the one or more isolation groups, and wherein the isolation profile comprises at least an isolation level to define a type of isolation; and allocate or reallocate the at least one resource to the at least one service based on the isolation profile linked to the one or more isolation groups.

The apparatus may further include wherein the isolation group is defined based on a type of the at least one resource, and characteristics of services supported by the at least one resource.

The apparatus may further include wherein resources allocated to service are physically or logically isolated resources of other services assigned in different from isolation groups, based on the isolation profile.

The apparatus may further include wherein the one or more isolation groups are assigned or created by a service consumer or service producer.

The apparatus may further include wherein the isolation level is either physical or logical isolation. The apparatus may further include wherein the isolation profile is associated with a service profile of a supported service, or is independent.

The apparatus may further include wherein the at least one resource is a management resource, and the at least one resource is a managed resource.

The apparatus may further include wherein the one or more isolation groups is a root isolation group, or the one or more isolation groups is contained by another isolation group.

The apparatus may further include wherein an isolation level of the containing isolation group is stricter than an isolation level of the contained isolation group.

The apparatus may further include wherein the at least one memory and the computer program code are further configured to, with the at least one processor, cause the apparatus at least to perform: determine an isolation for the at least one resource of one service by checking an isolation profile of a containing isolation group until all isolation groups in a chain of containing isolation groups, including the root isolation group, are addressed or considered.

The apparatus may further include wherein the at least one memory and the computer program code are further configured to, with the at least one processor, cause the apparatus at least to perform: determine an isolation for the at least one service by checking an isolation profile of a linked isolation group until a plurality of resource types are addressed.

The apparatus may further include wherein the resources of services assigned in an isolation group are shared without isolation when the resources of the services are assigned in a common isolation group; and wherein the resources of services assigned in an isolation group are shared with isolation when the resources of the services are further assigned in different isolation groups inside the common isolation group.

An example non-transitory program storage device readable by a machine, tangibly embodying a program of instructions executable by the machine for performing operations is provided, the operations comprising: assigning or creating one or more isolation groups for at least one service, wherein resources of services assigned in an isolation group are shared with or without isolation; wherein an isolation group is defined for at least one resource in each layer and each domain to gather the at least one resource of at the least one service; linking an isolation profile for each of the one or more isolation groups, wherein the isolation profile comprises at least one policy to protect the at least one resource of the one or more isolation groups, and wherein the isolation profile comprises at least an isolation level to define a type of isolation; and allocating or reallocating the at least one resource to the at least one service based on the isolation profile linked to the one or more isolation groups.

The non-transitory program storage device operations may further include wherein the isolation group is defined based on a type of the at least one resource, and characteristics of services supported by the at least one resource.

The non-transitory program storage device operations may further include wherein resources allocated to service are physically or logically isolated from resources of other services assigned in different isolation groups, based on the isolation profile.

The non-transitory program storage device operations may further include wherein the one or more isolation groups are assigned or created by a service consumer or service producer.

The non-transitory program storage device operations may further include wherein the isolation level is either physical or logical isolation.

The non-transitory program storage device operations may further include wherein the isolation profile is associated with a service profile of a supported service, or is independent.

The non-transitory program storage device operations may further include wherein the at least one resource is a management resource, and the at least one resource is a managed resource.

The non-transitory program storage device operations may further include wherein the one or more isolation groups is a root isolation group, or the one or more isolation groups is contained by another isolation group.

The non-transitory program storage device operations may further include wherein an isolation level of the containing isolation group is stricter than an isolation level of the contained isolation group.

The non-transitory program storage device operations may further include determining an isolation for the at least one resource of one service by checking an isolation profile of a containing isolation group until all isolation groups in a chain of containing isolation groups, including the root isolation group, are addressed or considered.

The non-transitory program storage device operations may further include determining an isolation for the at least one service by checking an isolation profile of a linked isolation group until a plurality of resource types are addressed.

The non-transitory program storage device operations may further include wherein the resources of services assigned in an isolation group are shared without isolation when the resources of the services are assigned in a common of services isolation group; and wherein the resources assigned in an isolation group are shared with isolation when the resources of the services are further assigned in different isolation groups inside the common isolation group.

An example apparatus includes means for assigning or creating one or more isolation groups for at least one service, wherein resources of services assigned in an isolation group are shared with or without isolation; wherein an isolation group is defined for at least one resource in each layer and each domain to gather the at least one resource of the at least one service; means for linking an isolation profile for each of the one or more isolation groups, wherein the isolation profile comprises at least one policy to protect the at least one resource of the one or more isolation groups, and wherein the isolation profile comprises at least an isolation level to define a type of isolation; and means for allocating or reallocating the at least one resource to the at least one service based on the isolation profile linked to the one or more isolation groups.

The apparatus may further include wherein the isolation group is defined based on a type of the at least one resource, and characteristics of services supported by the at least one resource.

The apparatus may further include wherein resources allocated to service are physically or logically isolated from resources of other services assigned in different isolation groups, based on the isolation profile.

The apparatus may further include wherein the one or more isolation groups are assigned or created by a service consumer or service producer.

The apparatus may further include wherein the isolation level is either physical or logical isolation.

The apparatus may further include wherein the isolation profile is associated with a service profile of a supported service, or is independent.

The apparatus may further include wherein the at least one resource is a management resource, and the at least one resource is a managed resource.

The apparatus may further include wherein the one or more isolation groups is a root isolation group, or the one or more isolation groups is contained by another isolation group.

The apparatus may further include wherein an isolation level of the containing isolation group is stricter than an isolation level of the contained isolation group.

The apparatus may further include means for determining an isolation for the at least one resource of one service by checking an isolation profile of a containing isolation group until all isolation groups in a chain of containing isolation groups, including the root isolation group, are addressed or considered.

The apparatus may further include means for determining an isolation for the at least one service by checking an isolation profile of a linked isolation group until a plurality of resource types are addressed.

The apparatus further may include wherein the resources of services assigned in an isolation group are shared without isolation when the resources of the services are assigned in a common isolation group; and wherein the resources of services assigned in an isolation group are shared with isolation when the resources of the services are further assigned in different isolation groups inside the common isolation group.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
    assigning or creating one or more isolation groups for at least one service, wherein resources of services assigned in an isolation group are shared with or without isolation;
    wherein an isolation group is defined for at least one resource in each layer and each domain to gather the at least one resource of the at least one service;
    linking an isolation profile for each of the one or more isolation groups, wherein the isolation profile comprises at least one policy to protect the at least one resource of the one or more isolation groups, and wherein the isolation profile comprises at least an isolation level to define a type of isolation;
    allocating or reallocating the at least one resource to the at least one service based on the isolation profile linked to the one or more isolation groups;
    wherein the one or more isolation groups is a root isolation group, or the one or more isolation groups is contained by another isolation group; and
    further comprising determining an isolation for the at least one resource of one service by checking an isolation profile of a containing isolation group until all isolation groups in a chain of containing isolation groups, including the root isolation group, are addressed or considered.

2. The method of claim 1, wherein the isolation group is defined based on a type of the at least one resource, and characteristics of services supported by the at least one resource.

3. The method of claim 1, wherein resources allocated to service are physically or logically isolated from resources of other services assigned in different isolation groups, based on the isolation profile.

4. The method of claim 1, wherein the one or more isolation groups are assigned or created by a service consumer or service producer.

5. The method of claim 1, wherein the isolation level is either physical or logical isolation.

6. The method of claim 1, wherein the isolation profile is associated with a service profile of a supported service, or is independent.

7. The method of claim 1, wherein the at least one resource is a management resource, and the at least one resource is a managed resource.

8. The method of claim 1, wherein an isolation level of the containing isolation group is stricter than an isolation level of the contained isolation group.

9. The method of claim 1, further comprising determining an isolation for the at least one service by checking an isolation profile of a linked isolation group until a plurality of resource types are addressed.

10. The method of claim 1,
- wherein the resources of services assigned in an isolation group are shared without isolation when the resources of the services are assigned in a common isolation group; and
- wherein the resources of services assigned in an isolation group are shared with isolation when the resources of the services are further assigned in different isolation groups inside the common isolation group.

* * * * *